April 15, 1941. O. MYERS 2,238,126
TROUBLE RECORDER
Filed Nov. 15, 1939 12 Sheets-Sheet 6

April 15, 1941.  O. MYERS  2,238,126
TROUBLE RECORDER
Filed Nov. 15, 1939    12 Sheets-Sheet 3

INVENTOR
O. MYERS
BY P. C. Smith
ATTORNEY

April 15, 1941.

O. MYERS 2,238,126

TROUBLE RECORDER

Filed Nov. 15, 1939

INVENTOR
O. MYERS
BY P. C. Smith
ATTORNEY

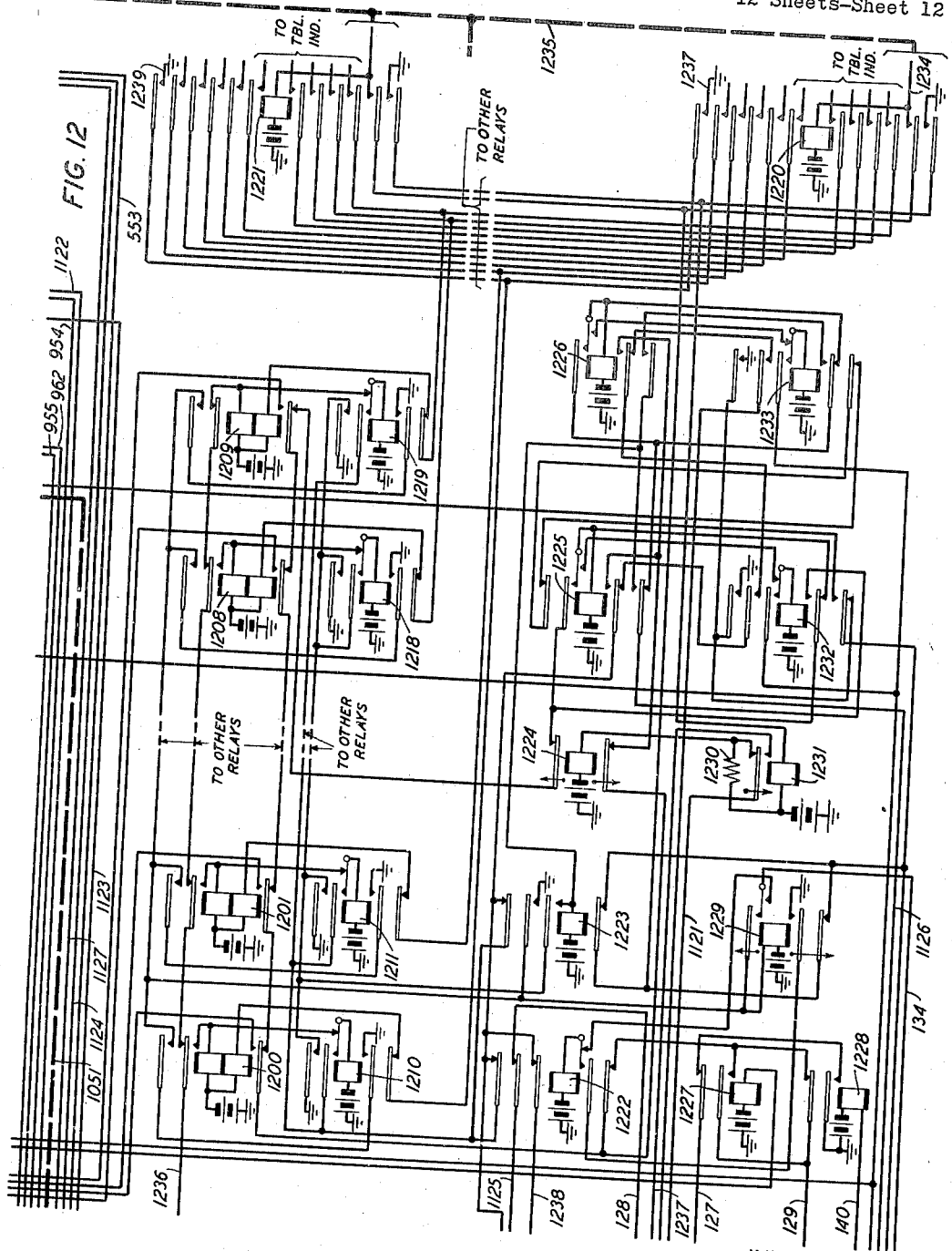

Patented Apr. 15, 1941

2,238,126

UNITED STATES PATENT OFFICE 2,238,126

TROUBLE RECORDER

Oscar Myers, Mount Vernon, N. Y., assignor to Bell Telephone Laboratories, Incorporated, New York, N. Y., a corporation of New York Application November 15, 1939, Serial No. 304,473

18 Claims. (Cl. 179—175.21)

This invention relates to telephone systems and has for its object the improvement of such systems by the provision of more convenient records of trouble conditions.

It has long been customary in certain telephone systems to provide trouble indicators which are brought into service when troubles occur and which light lamps indicative of troubles encoutered. It has also been suggested that permanent records be made of such troubles by the use of automatic typewriters such as are used in telegraphy.

The present invention relates to improvements in the means by which the lamp record is transformed into the printed record.

More specifically, each of the circuits which light the lamps of the trouble indicator is extended in parallel to the recorder circuit. Means is provided for extending these circuits in groups to a set of scanning relays which determine whether any circuits in the group are marked.

In addition, means is provided for recording the identity of each grounded lamp circuit by means of one or more characters which may be all letters, all numbers or a combination of both.

Each lamp circuit corresponds to a cross-point on a cross-bar switch and means is provided for preparing the cross-points in groups and closing only those cross-points which correspond to grounded lamp circuits.

Each cross-point has four contacts which are cross-connected to character relays in accordance with the identifying designation of the corresponding lamp circuit. A series of steering relays is provided which normally close the circuits of two cross-point contacts in succession to record two letters, rearrange the printer to print numbers, then close the remaining two contacts to record two numbers and finally cause the printer to space. Means is also provided under the control of the cross-points to modify the operation of these relays to record other identifying characters, and to omit the space.

These and other features of the invention will be more clearly understood from a consideration of the following description in connection with the drawings in which:

Fig. 12 shows the group relays, the scanning relays and those which control the hold magnet operation; and Fig. 13 shows the relative arrangement of Figs. 1 to 12.

The present trouble recorder is arranged to work with a trouble indicator which is associated with a terminating marker such as shown in Patent No. 2,232,371, granted Feb. 18, 1941, to J. W. Dehn and O. Myers. The details of a trouble indicator serving a decoder marker are shown in the Patent No. 2,202,921 to A. C. Powell, granted June 4, 1940.

When a trouble occurs in a marker, the trouble indicator is seized and the relays of the indicator connected to the marker. A relay is connected in parallel with each piece of significant equipment in the marker, so that the indicator relays are operated in accordance with the equipment which is in use in the marker. For example, circuits are provided to operate relays to indicate the number of the wanted line, and, if the call has progressed that far, to indicate the switching equipment which was used in attempting to obtain access to the line. Other circuits are closed as the call progresses, by which relays are operated which indicate the stage at which the call failed. The operated relays light lamps which show the recorded information. In the past the marker has been released, but the indicator held until released by a maintenance man. In order to make a record of the trouble for future use the maintenance man had to make it longhand, which was subject to errors.

Figure 4:
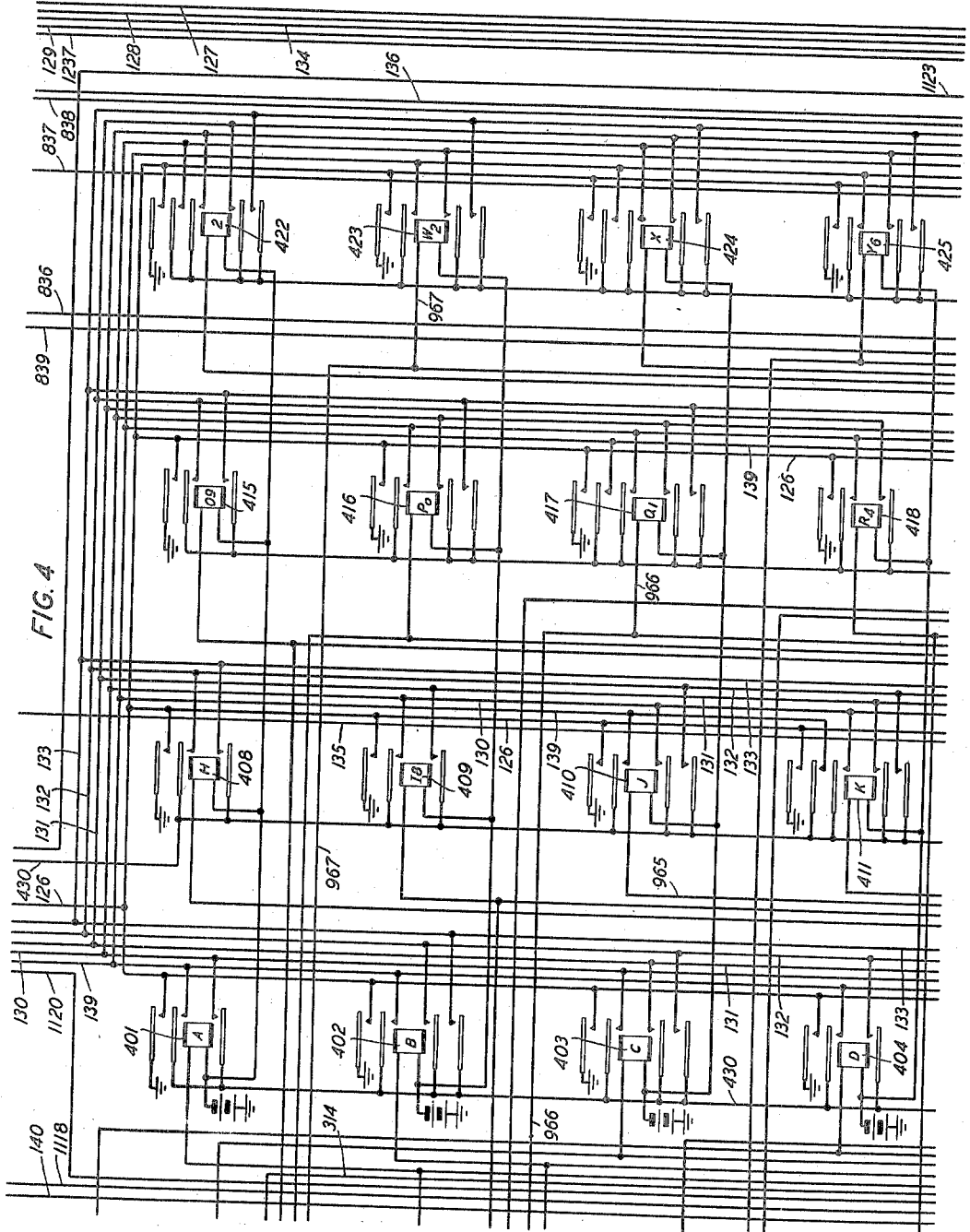
Figs. 4 and 8 show the character relays.
Figure 5:
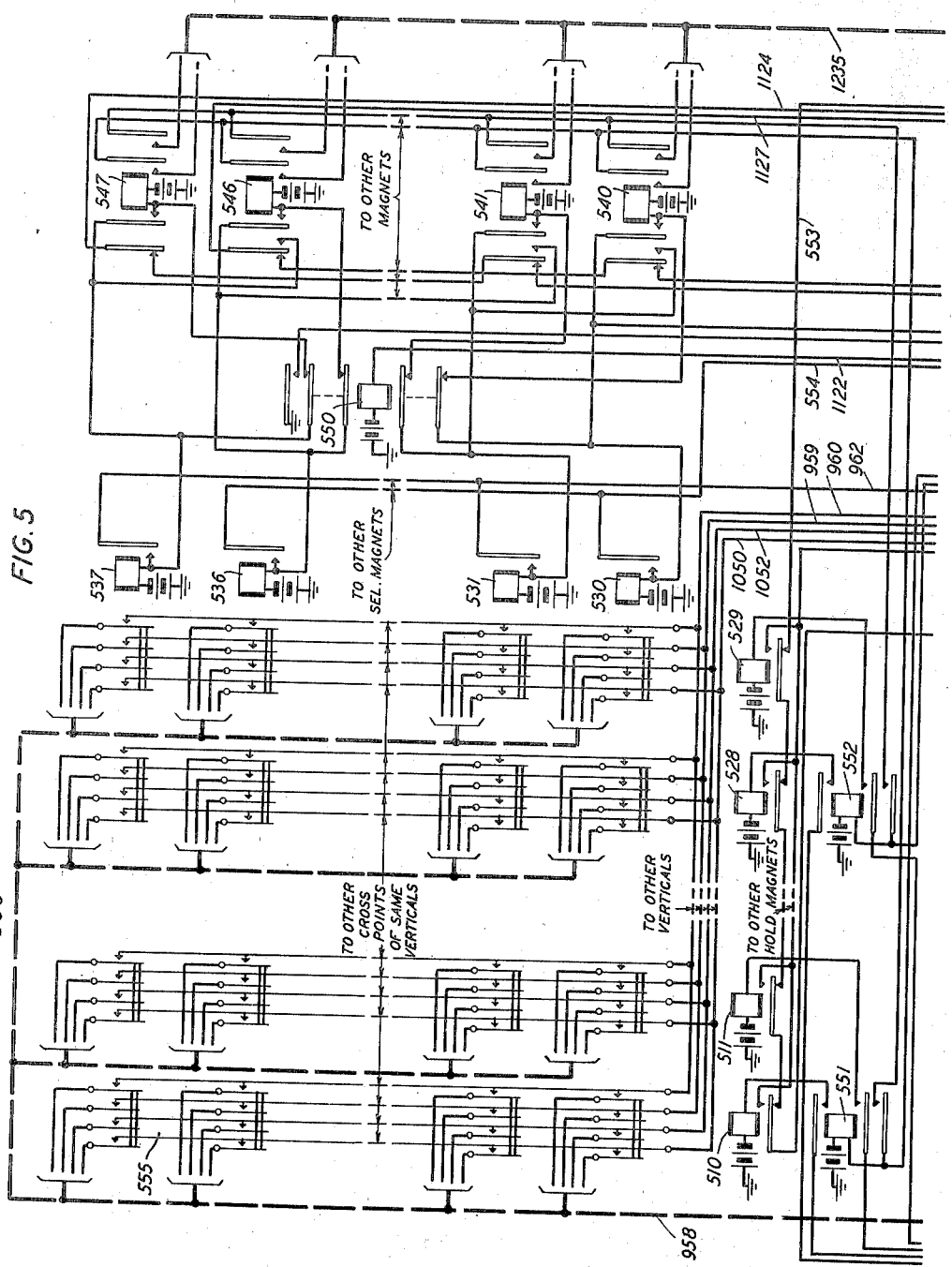
Figs. 5 and 9 show the cross-bar switches with their control magnets.
Figure 6:
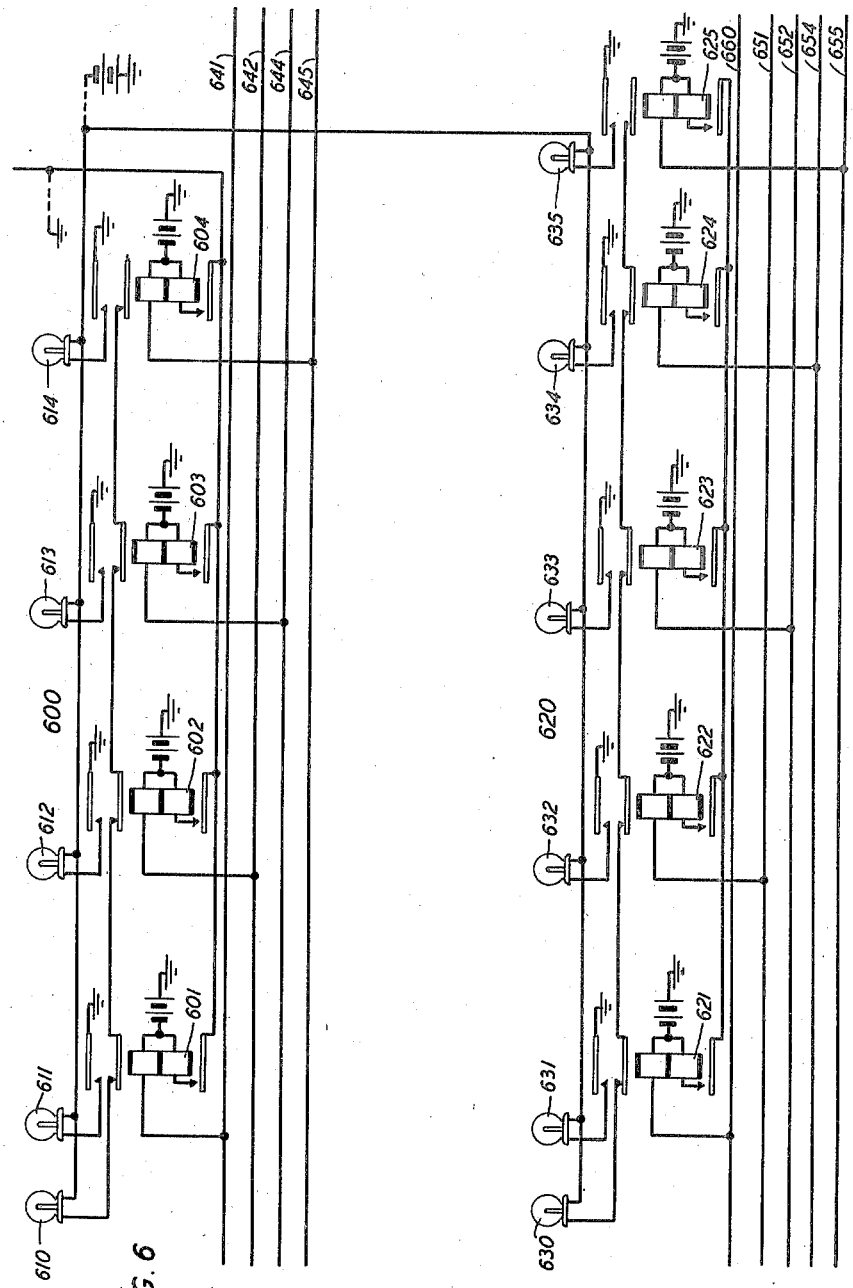
Figure 7:
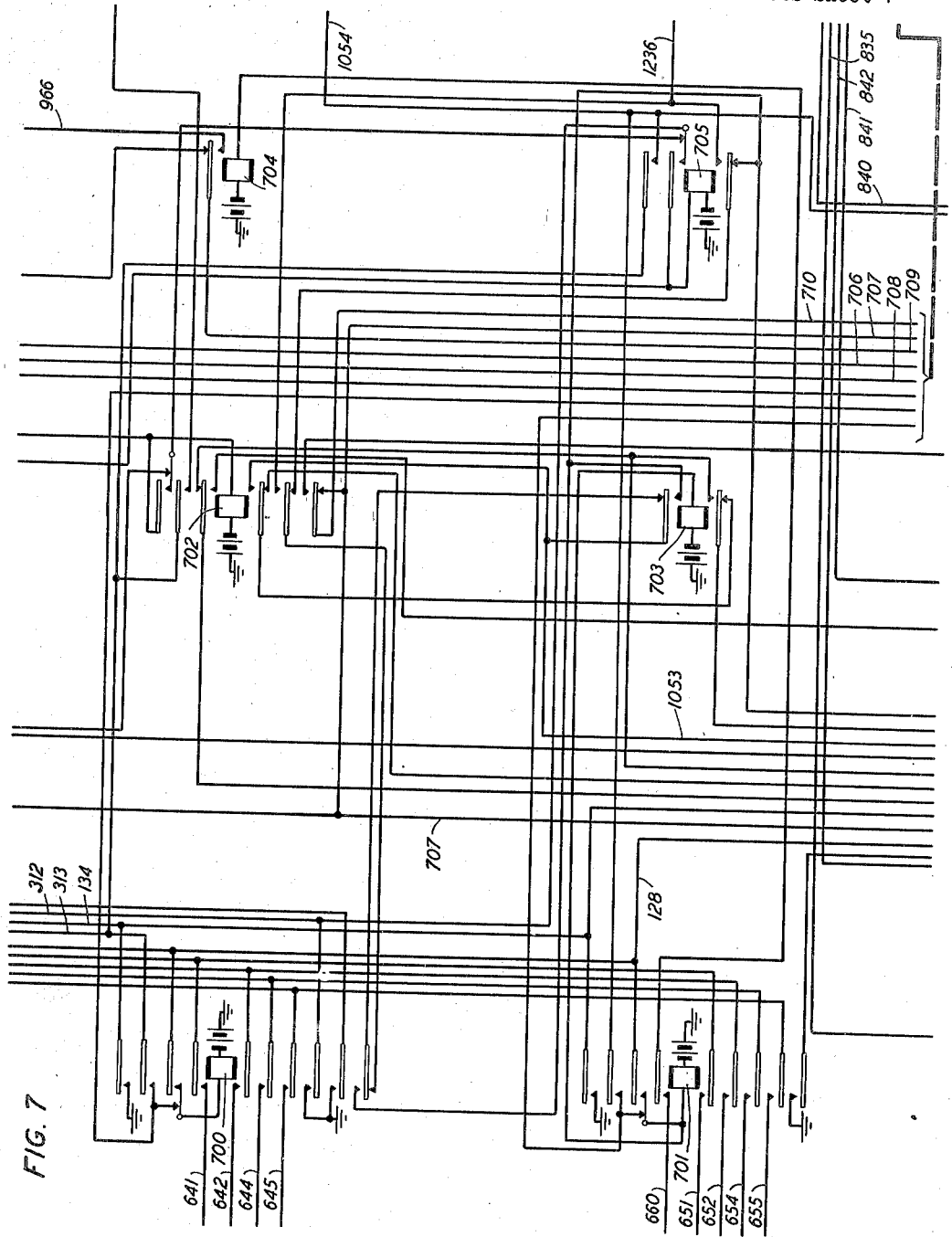
Figure 8:
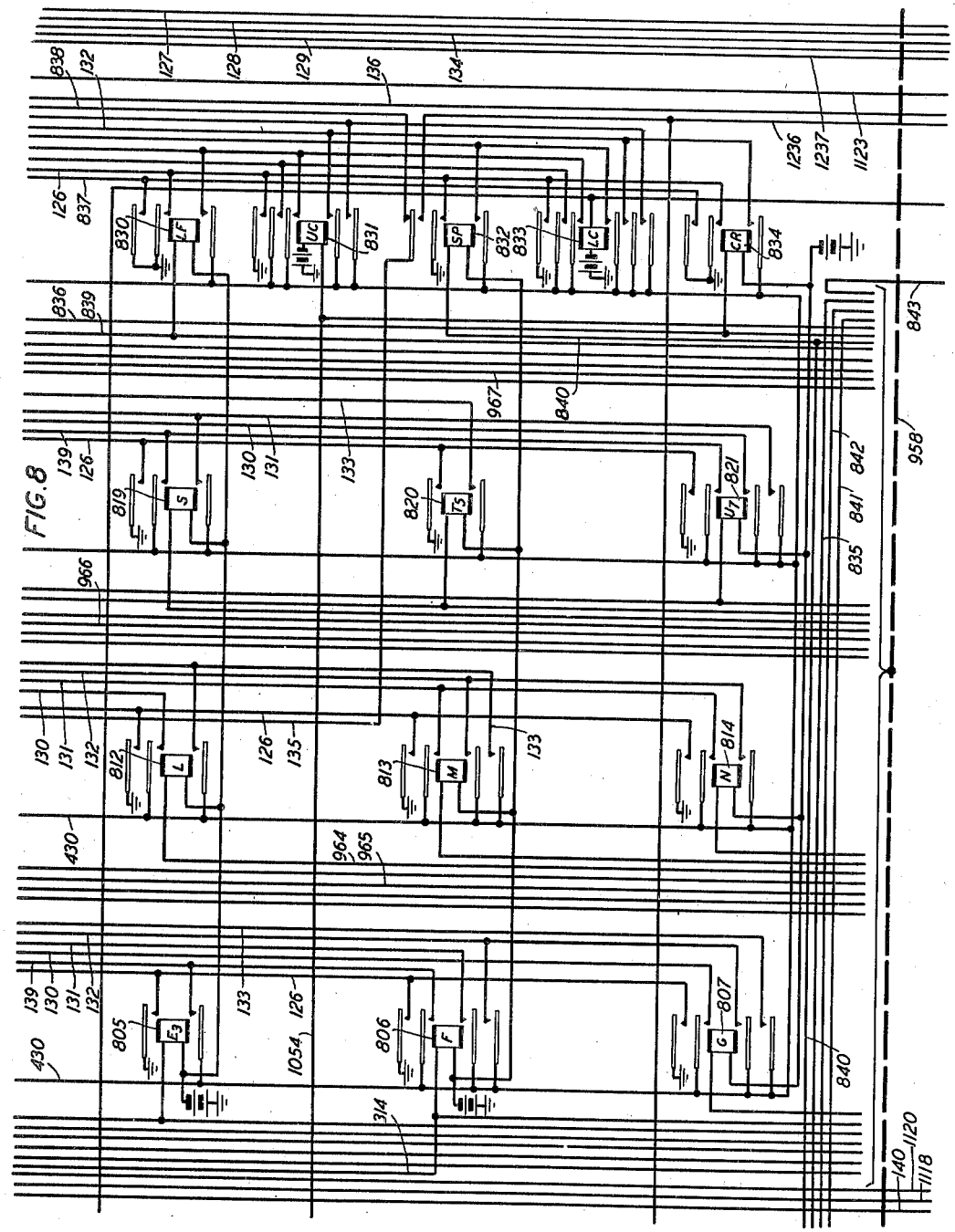
Figure 9:
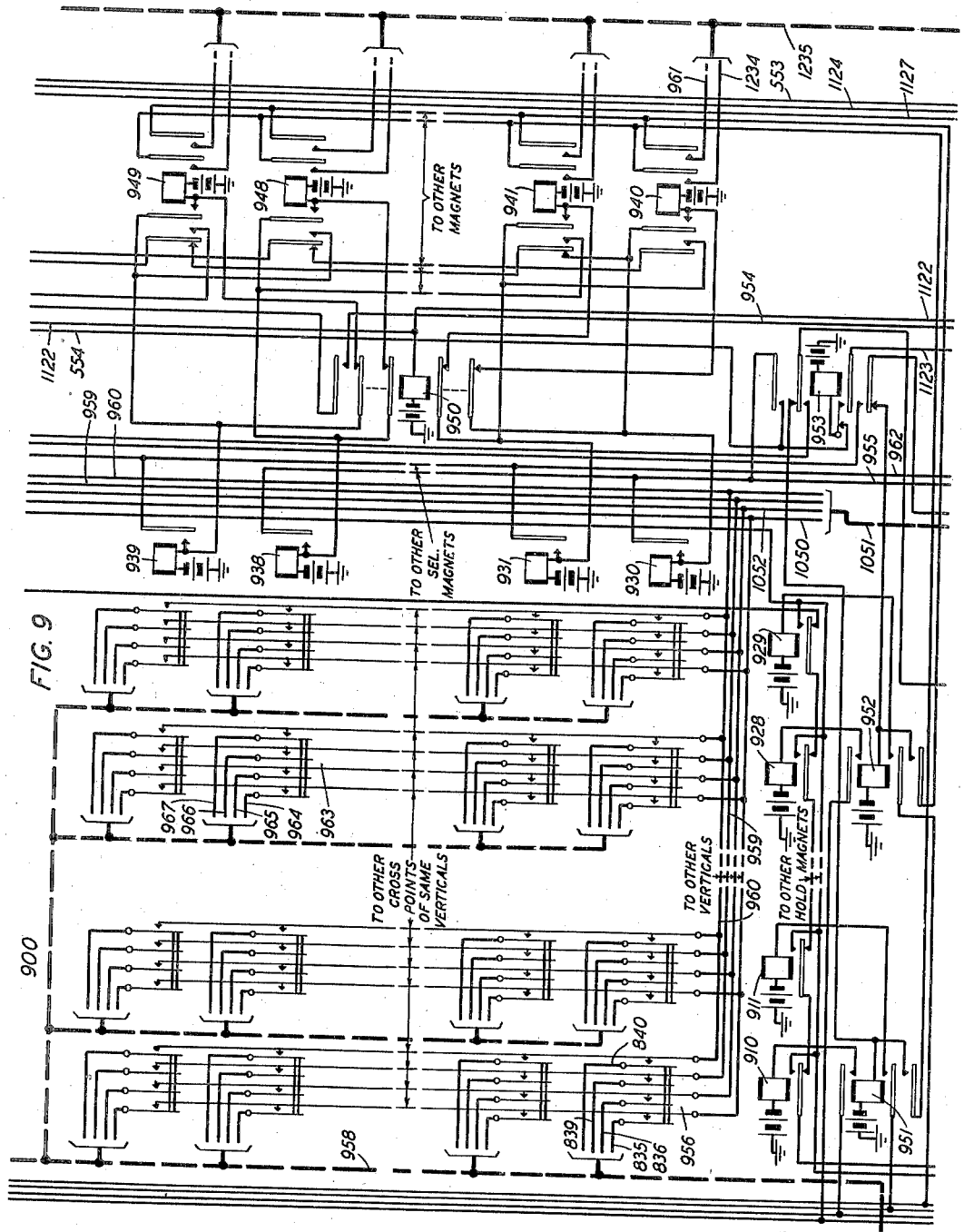

The trouble recorder of the present disclosure comprises a standard teletype transmitter distributor 100 and printer 111. The codes transmitted are produced by grounding the signal circuit over segments of the distributor 100 and armatures of the character relays of Figs. 4 and 8.

The information set up on the indicator is passed to the recorder by means of a set of group relays 1220, 1221, etc. each of which may connect ten conductors to the ten scanning relays 1200 to 1209. Individual to each conductor is a cross-point on a pair of cross-bar switches 500 and 900. The select magnets of these switches are operated in succession by a chain arrangement, while the hold magnets are operated under the control of the scanning relays so that only those cross-points are closed which correspond to grounded conductors. Switches having twenty verticals have been employed and the scanning relays are used twice for each level. Each cross-point has four contacts over which character relays are operated under the control of the character control relays of Fig. 10 to cause the printing of a maximum of four characters.

Detailed description

When it is desired to make a printed record of the troubles as they occur, a key, associated with the trouble recorder, is operated. With this key operated, the seizure of the trouble indicator by the marker for the purpose of recording a trouble condition, connects ground to conductor 1117. This ground completes a circuit over the back contact of relay 1105, to the winding of relay 1103 and battery. Relay 1103 locks over conductor 1129 and extends the locking ground over conductor 1130 extending to the indicator to ground the lamp circuits. Relay 1103 closes an obvious circuit for relay 1104, which locks over its lower front contact to ground at the back contact of relay 1108. With relays 1103 and 1104 both operated, ground is connected to conductor 1118, to start the motors of both the transmitter distributor 100 and the printer 111.

Relay 1104 also closes an obvious circuit for relay 1105 which in turn opens the operating circuit of relay 1103 and grounds conductor 1119 leading to interrupter 1100. When interrupter 1100 closes its right contact, it completes a circuit for relay 1101 which locks to conductor 1119. With relay 1101 operated, the closure of the left contact of interrupter 1100 completes a circuit for relay 1102 which also locks to conductor 1119. The operation of relays 1101 and 1102 permits the motors of the distributor and printer to attain operating speeds before starting to make the record.

Transmission control

The teletypewriter used operates on the "start-stop" principle. The two motors are run synchronously, and the drive shaft of the transmitter distributor is connected through a friction clutch to the brush arm 110, which is held in a normal position by latch 109 controlled by magnet 101. The teletypewriter responds to the closures of the selector magnet circuit to print characters dependent on the combinations of such closures.

The transmitter distributor 100 is required to transmit a combination of closures in one revolution and this is accomplished by the use of a commutator which is divided into a number of segments 103 to 107. These segments are connected to the contacts of relays 401 to 425 whereby signal leads are closed at various positions in the revolution of the distributor 100. Since the distributor and printer motors run in synchronism, they occupy the same relative positions at the same time, with the same resulting effect as though conductors connected distributing and sending segments each to each.

The trouble indicator is connected to the trouble recorder by making a multiple connection at each lamp and extending these multiple connections to the front contacts of relay 1220, 1221, etc. Each relay 1220, 1221, etc. controls ten of these connections. The connections from the designation and frame registers are made in smaller groups to relays 300, 305, 308, 700 and 701.

Associated with the transmitter distributor 100 are thirty character relays, namely, 401 to 425, 805 to 821, which correspond to the letters A to Y, and relays 830 to 834 which control modifications of the printer operation. The relays 416, 417, 423, 805, 418, 820, 425, 821, 409 and 415 also control the printing of the digits 0 to 9 respectively when the printer is adjusted to print numerical characters.

These character relays, when operated, close ground to the segments 103 to 107 of the distributor commutator in accordance with a predetermined code. They also supply ground over conductor 126 to the armature of relay 114. Therefore, when start relay 1103 operates, grounding conductor 1120, with the distributor brush in its normal position, a circuit is closed from ground over the inner upper front contact of relay 1103, conductor 1120, distributor feed segment 124, normal segment 108, winding of relay 114, over conductor 125, which connects the transmitter and the printer, and through the printer to resistance 113 and battery. With any one of the character relays operated, relay 114 extends ground from conductor 126 over the upper back contact of relay 117, normal contacts and winding of relay 116, to battery. Relay 116 operates, locks over its upper alternate contacts to conductor 126, and completes a circuit from battery through the winding of magnet 101, inner lower front contact of relay 116, lower back contact of relay 117, inner lower back contact of relay 118, conductor 128, middle upper back contact of relay 1222, conductor 1125 to ground at the second upper contact of relay 1103. The operation of magnet 101 withdraws latch 109 and permits brush 110 to make one revolution. As brush 110 leaves normal and passes over segment 102 the signal circuit is opened to release the selector magnet of the teletypewriter 111 and permit its associated mechanism to revolve in synchronism with that of distributor 100. As the brush 110 passes over segments 103 to 107, ground is connected to signal conductor 125 according to the wiring of the operated character relay. For example, assume that relay 401 is operated. In that case, when brush 110 reaches segment 103 a circuit is closed from ground to feed ring 124 as previously traced, brush 110, segment 103, conductor 139, inner upper front contact of relay 401, conductor 430 to the signal conductor 125 and the printer 111. A circuit is closed over segment 104, conductor 130 and the lower contact of relay 401, but no circuits are closed over segments 105 to 107.

When relay 116 operated it closed a circuit from battery through resistance 115, winding of relay 117, alternate contacts of relay 116 to grounded conductor 126. However, relay 117 is shunted by ground over the contact of relay 114 and the upper back contact of relay 117. As soon as brush 110 leaves the normal segment 108, relay 114 releases, permitting relay 117 to operate. The operation of relay 117 opens the circuit of magnet 101 and latch 109 drops back in position to arrest brush 110 when it again reaches normal. When this occurs, the circuit of relay 114 is reclosed, completing a circuit from ground on conductor 126, contact of relay 114, upper front contact of relay 117, normal contacts and winding of relay 118 and battery.

Relay 118 causes the release of one character relay and the operation of a subsequent character relay as will be described hereinafter.

*Operation of cross-bar switches*

Two cross-bar switches are provided for controlling the operation of the character relays. Each switch has ten levels, each level containing twenty contact sets. The select magnets 930 to 939 and 530 to 537 prepare the levels and the hold magnets 510 to 529 and 910 to 929 close the individual contacts in the level. Each cross-point includes four contacts, permitting the control of four circuits by each cross-point.

There is a cross-point for each item of information to be recorded, most of them corresponding to particular conductors leading into the recorder from the trouble indicator. Each of the group relays 1220, 1221, etc., belongs to ten of these conductors and, therefore, two of these relays relate to one level.

When start relay 1103 operated, it closed a circuit to determine that none of the cross-points was falsely operated. This circuit may be traced from ground at the lowermost front contact of relay 1103, conductor 1121, normal contacts of relay 1107, back contacts of hold magnets 910–929 and 510 to 529, conductor 553, lower back contact of relay 1110 to the winding of relay 1111 and battery. Relay 1111 operates and locks over its inner upper front contact, normal contacts of relays 1110 and 1107, to ground over conductor 1121. Relay 1111 closes an obvious circuit for relay 1112 which in turn grounds conductor 1122, thereby operating relays 950 and 550. Relays 550 and 950 open the operating circuits for the relays 540 to 547 and 940 to 949.

With both relays 550 and 950 operated, a circuit is closed from ground at the upper front contact of relay 550, upper front contact of relay 950, conductor 954, outer lower front contact of relay 1111, normal contacts and winding of relay 1115, resistance 1116 to battery. Relay 1115 operates and locks to ground over conductor 1123 and the third upper front contact of relay 1103. Relay 1115 prepares a circuit from battery through resistance 1113, winding of relay 1114, alternate contacts of relay 1115 to grounded conductor 1123, but ground over the operating circuit of relay 1115 is connected over the inner upper back contact of relay 1114 to resistance 1113 in shunt of the winding of relay 1114 to prevent its operation at this time.

With relay 1115 operated, the first level of the first switch 900 is prepared by closing the circuit for operating even numbered select magnets. This circuit may be traced from ground on conductor 1123, outer upper front contact of relay 1115, outer lower back contact of relay 1114, to conductor 1124. Since none of the relays 940 to 949, 540 to 547 is operated the circuit extends over the back contacts of the odd numbered relays of these groups to the winding of select magnet 930 and battery. The select magnet 930 extends its operating ground over its right contact, conductor 955, inner lower back contact of relay 1114, inner lower front contact of relay 1111 to the winding of relay 1110 and battery. Relay 1110 operates and locks over its upper alternate contacts and the normal contacts of relay 1107 to grounded conductor 1121. With relay 1110 operated, a locking circuit is completed for the select magnet which may be traced from conductor 955 over the inner upper front contact of relay 1115, outer lower front contacts of relay 1110 to grounded conductor 1123. Relay 1110 also closes an obvious circuit for relay 1106 which supplies an additional holding ground for relay 1105.

With relay 1110 operated, the operating and locking circuits for relay 1111 are opened and relay 1111 releases in turn releasing relay 1112. Relay 1112 is slow to release in order to introduce a time interval during which the select magnet and its associated contacts may be fully operated. The release of relay 1111 permits relay 1114 to operate in the above traced circuit. With relay 1114 operated, an additional locking circuit is provided for select magnet 930 which extends from conductor 955 over the upper front contact of relay 1114 to grounded conductor 1123.

The release of relay 1112 opens the operating circuit for relays 950 and 550, thereby connecting relays 940 to 949, 540 to 547 in parallel with the corresponding select magnets. Since magnet 930 is operated, the locking ground for that magnet extends over the outer lower back contact of relay 950 to the winding of relay 940 and battery. Relay 940 operates and locks, in parallel with magnet 930, independent of relay 950.

When relay 1112 closes its upper back contact, it completes a circuit from ground on that contact, middle upper front contact of relay 1110, outer lower back contact of relay 1232, upper back contact of relay 953 to the winding of relay 951 and battery. Relay 951 prepares the operating circuits for the first ten hold magnets 910, 911, etc.

With relays 951 and 940 operated, a circuit is closed for the first group relay 1220. This circuit may be traced from battery through the winding of relay 1220, conductor 1234, through cable 1235, inner right contact of relay 940, outer lower contact of relay 951, over the operating circuit of relay 951 to ground as previously traced. Relay 1220 in operating locks over its fifth lower contact, lower back contacts of relays 1223 and 1229 in parallel, middle upper front contact of relay 1110 to ground at the back contact of relay 1112. It also closes an obvious circuit for relay 1231, which is made slow to operate by ground on conductor 1121 which is connected over the back contact of the relay and resistance 1230 in parallel with the relay winding.

The operation of relay 1220 connects ten conductors to the scanning relays 1200 to 1209. Normally these ten conductors extend to lamp circuits in the trouble indicator, but the first five conductors controlled by relay 1220 do not. The first conductor 1237 is connected to direct ground, while the next four conductors are left open. The remaining conductors extend to lamps indicating the identity of the marker from which the record is to be taken. Other conductors of the group carrying this information are connected to the next group relay (not shown). Those scanning relays, which find ground on the corresponding conductors, operate. Assuming, for example, that no other relays find ground, only scanning relay 1200 operates.

When relay 1231 operates as above described, it closes a circuit from grounded conductor 1121, front contact of relay 1231, conductor 1237, lower back contact of relay 119, conductor 129, back contact of relay 1228, outer lower back contact of relay 1222, lower front contact of relay 1200, inner upper front contact of relay 951 to the winding of hold magnet 910 and battery. With select magnet 930 and hold magnet 910 operated, the contacts of cross-point 956 are closed.

Start of record

The contacts of the cross-points are normally cross-connected to the character relays in accordance with the designation of the associated lamp in the trouble indicator. However, cross-point 956 has its outer left contact connected to conductor 835, its inner left contact connected to conductor 836, its inner right contact to conductor 839 and its outer right contact to conductor 840.

As soon as the cross-point closes, a circuit is closed from grounded conductor 1121, lower front contact of relay 1102, inner upper back contact of relay 1222, conductor 1238, outer lower back contacts of relays 1042, 1032, 1022, 1012, and 1002, conductor 1050, through cable 1051, outer left contact of cross-point 956, conductor 835, extending through cable 958, normal contacts and winding of relay 1003 to battery. Relay 1003 operates and locks over its upper alternate contacts, conductor 128, middle upper back contact of relay 1222, conductor 1125 to ground at the second upper front contact of relay 1103. With relay 1003 operated a circuit is closed from ground to conductor 1238 as previously traced, outer lower back contacts of relays 1042, 1032 and 1022, inner lower front contact of relay 1003, outer lower back contact of relay 1001, conductor 1052 through cable 1051, inner left contact of cross-point 956, conductor 836 through cable 958, winding of character relay 834 to battery.

With relay 834 operated, ground is connected to conductor 126, operating relays 114 and 116 as above described. Relay 116 operates magnet 101 and releases the brush 110 to make a revolution. Relay 834 connects the signal conductor 125 to segment 106 to send out a pulse in the fourth period. This signal causes the teletypewriter carriage to return to normal, irrespective of its previous position.

When the brush 110 returns to normal, relay 114 reoperates, and relay 117 having operated as previously described, closes a circuit from ground on conductor 126, contact of relay 114, upper front contact of relay 117, normal contacts and winding of relay 118 to battery. Relay 118 operates and locks over its upper contacts to ground at the lower front contacts of relays 116 and 117. Relay 118 at its outer lower front contact closes a circuit from grounded conductor 1125, middle upper back contact of relay 1222, conductor 128, outer lower front contact of relay 118, upper back contact of relay 119, conductor 135, back contact of relay 832, conductor 838, back contact of relay 122, conductor 136, outer upper front contact of relay 1003, inner lower back contact of relay 1022, winding of relay 1021 and battery. Relay 1021 locks over its outer upper contacts to its operating ground, independent of relay 1022 and extends this ground over its inner upper contact to the normal contacts and winding of relay 1022 and battery.

Relay 1022 operates and locks over its alternate contacts to conductor 128 and ground as previously traced. With relay 1022 operated, the circuit of character relay 834 is opened and that relay releases in turn releasing relays 114, 116, 117 and 118. The release of relay 118 opens the circuit above traced for relay 1021 which in turn releases.

With relay 1022 operated and relay 1021 released a circuit is closed from battery through the winding of relay 833, conductor 839, extending through cable 958 over the inner right contact of cross-point 956, conductor 959, extending through cable 1051, lower back contact of relay 1021, middle lower front contact of relay 1022 outer lower back contacts of relays 1032 and 1042, conductor 1238 to ground as previously traced. With relay 830 operated, the brush 110 will make another revolution, during which ground is transmitted to the printer when the brush engages segment 104 as a signal to the printer to feed the paper forward. When relay 118 operates at the end of the revolution, the circuit for the character control relays is closed as previously traced to the inner lower armature of relay 1022 and thence over the front contact of that armature, middle lower back contact of relay 1021, outer upper back contact of relay 1013, conductor 1053, upper back contact of relay 703 lower back contact of relay 700, middle lower back contact of relay 702, lower back contact of relay 705, inner lower back contact of relay 1032, to the winding of relay 1031 and battery. Relay 1031 operates, locks to its operating circuit and operates relay 1032 in a manner similar to relay 1021.

The operation of relay 1032 releases the character relay 830 which in turn releases relays 114, 116, 117, 118 and 1031.

With relay 1031 released and relay 1032 operated, character relay 832 is operated over conductor 840, extending through cable 958, right contact of cross-point 956, conductor 960 extending through cable 1051 inner lower contact of relay 1031, middle lower front contact of relay 1032, outer lower back contact of relay 1042, and conductor 1238 to ground as traced. Relay 832 causes the brush 110 to make another revolution and transmit an impulse to the printer 111 as it passes segment 105 to cause the printer to advance one space without printing a character. When relay 118 operates at the end of the revolution, with relay 832 operated, a circuit is closed from ground on conductor 1125, middle upper back contact of relay 1222, conductor 128, outer lower front contact of relay 118, upper back contact of relay 119, conductor 135, outer upper front contact of relay 832, conductor 1236, inner upper front contact of relay 1200, normal contacts and winding of relay 1210 to battery. Relay 1210 locks over its inner upper front contacts, over the outer upper back contact of relay 1222 and the upper back contact of relay 1223 in parallel, lower contact of relay 1102, to grounded conductor 1121. Relay 1210 opens the operating circuit of relay 1200, but that relay is held operated in a circuit through its upper winding and inner upper front contact to ground, over conductor 1236 as traced.

Advance to next cross-point

The operation of relay 1210 terminates the action in connection with cross-point 956, during which the teletypewriter carriage was restored to the beginning of a line, the paper was advanced one line and the carriage advanced one space. Thus when a new indication is recorded, it is recognized on the teletypewriter sheet by an indented line.

Relay 1210 in operating closes a circuit from ground over its lower front contact, outer upper front contact of relay 1200 to the winding of relay 1229 and battery. Relay 1229 operates and locks over its outer upper front contact to conductor 134 which is grounded by relays 118, 1003, 1022 and 1032. Relay 1229 also extends its locking ground over its inner upper front contact to the normal contacts and winding of relay 1222 and battery. Relay 1222 locks to ground at the lower front contact of relay 1229 and disconnects ground from conductors 128 and 1238, thereby releasing character relay 832, and character control relays 1003, 1022 and 1032. The release of the character relay 832 releases relays 114, 116, 117 and 118. When all of these relays have released, the locking circuit of relay 1229 is opened and that relay releases in turn releasing relay 1222.

The release of relay 118 opens the circuit of relay 1200 which releases, while relay 1210 is held operated as above traced over the back contact of relay 1223. The release of relay 1200 opens the circuit of hold magnet 910 and that magnet releases, opening cross-point 956.

It will be remembered that no other scanning relay was operated from the conductors closed by group relay 1220. When relay 1222 recloses its back contacts, the hold magnet operating circuit is closed as above traced to the lower armature of relay 1200. With relay 1200 normal, the circuit extends over the lower back contacts of relays 1200, 1201, and the intermediate scanning relays, lower back contacts of relays 1208 and 1209, upper back contact of relay 1224, inner lower back contact of relay 1232, winding of relay 1225 and battery. Relay 1225 operates, locks over its outer upper front contact to the above traced operating circuit, independent of relay 1232 and extends this operating circuit over its inner upper contact to the normal contacts and winding of relay 1232 and battery. Relay 1232 operates and locks over its inner upper front contact and the normal contacts of relay 1107 to grounded conductor 1121. Relay 1232 grounds conductor 1126 to hold relay 1106 operated. With relays 1232 and 1225 operated, the operating circuit for relay 1225 is extended over the inner lower front contact of relay 1232, outer lower front contact of relay 1225 to the winding of relay 1223 and battery. Relay 1223 operates and locks over its inner upper front contact to ground at the outer upper front contact of relay 1210 and any other of the group operated. Relay 1223 at its outer upper front contact closes an obvious circuit for relay 1229 which operates relay 1222 as previously described.

The operation of relay 1232 opens the circuit of relay 951 which controls the hold magnets for the first ten sets of cross-points and group relay 1220, but the locking circuit for these relays remains closed until both relays 1223 and 1229 have operated. Similarly, the locking circuit for relay 1210 remains closed until both of these relays operate. When relay 1220 releases it releases relay 1231 which connects grounded conductor 1121 to the winding of relay 1224. Relay 1224 opens the locking circuit of relay 1225 which releases.

With relay 1225 released, relay 952 which controls the hold magnets for the second ten cross-points is operated over the outer lower back contacts of relays 953 and 1233, outer upper back contact of relay 1225, outer lower front contact of relay 1232, middle upper front contact of relay 1110 to ground at the upper back contact of relay 1112. Relay 952 extends its operating ground over the outer right contact of relay 940 to conductor 961 which extends to the second group relay like relay 1229. As before, the group relay operates relay 1231 which releases relay 1224.

Figure 10:
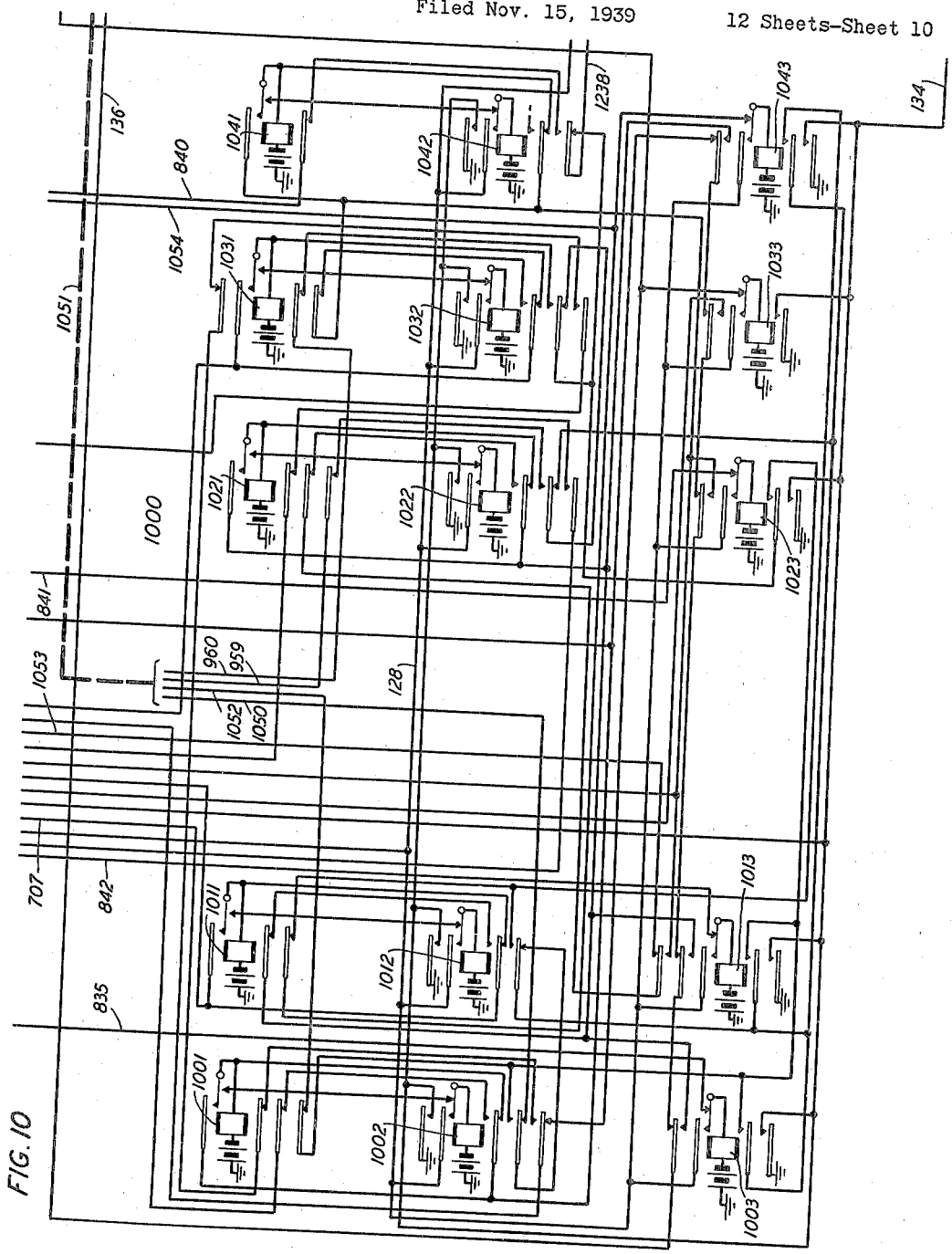
Fig. 10 shows the character control or steering relays.
Figure 11:
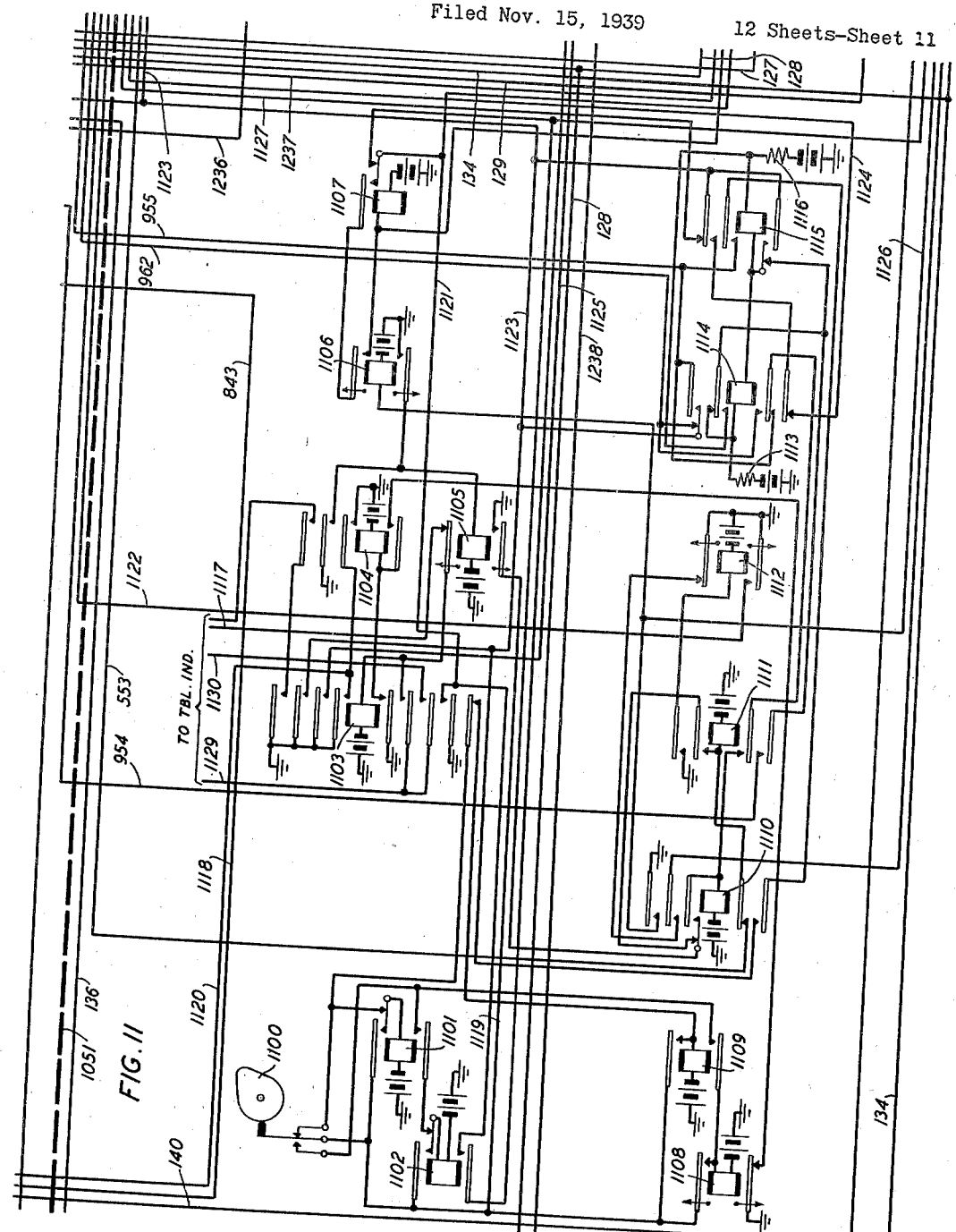
Fig. 11 shows the circuits which control the select magnets of the switches.

When all of the relays 1210, etc. have released and all of the character control relays of Fig. 10 have released, relays 1229 and 1223 release, in turn releasing relay 1222 and permitting the group relay to lock. With the second group relay operated, the scanning relays 1200, 1201, 1208, 1209, etc. are connected to another group of lamp circuits of the trouble indicator and operate in accordance therewith. With relay 952 operated, the hold magnets of the second ten rows of crosspoints, including magnets 928 and 929 are placed under the control of the scanning relays and records made corresponding thereto.

After all the records covered by the second group relay have been transmitted, and relay 1222 releases as well as all of the relays 1200 to 1209, a circuit is closed from ground as previously traced to the lower back contact of relay 1222, over the lower back contacts of the scanning relays 1200 to 1209, upper back contact of relay 1224, inner lower front contact of relay 1232, outer lower back contact of relay 1225, inner lower back contact of relay 1233 to the winding of relay 1226 and battery. Relay 1226 operates, locks to its operating circuit independent of relay 1233 and extends that circuit to the winding of relay 1233 which also operates and locks over its inner upper front contact, normal contacts of relay 1107 and grounded conductor 1121. Relay 1233 also grounds conductor 1126. With relays 1226 and 1233 operated their operating circuit is extended to the winding of relay 1223 which operates and locks under the control of relays 1210 to 1219. Relay 1223 operates relay 1229, which locks under the control of the character control relays and in turn operates relay 1222. Relay 1222 opens the locking circuits of relays 1210 to 1219 and the character control relays and when all have released, relays 1223, 1229 and 1222 also release. The operation of relays 1223 and 1229 released the group relay and relay 952 which in turn released relay 1231 and caused the operation of relay 1224. With relay 1224 operated, relay 1226 is released.

*Advance to next level*

Having completed the use of the first row of cross-points in switch 900, it is now necessary to advance to the next level. To this end, the release of relay 1226 closes a circuit from grounded conductor 1121, lower front contact of relay 1102, inner lower back contact of relay 1225, middle upper front contact of relay 1232, inner lower back contact of relay 1226, middle upper front contact of relay 1233 to the winding of relay 1107 and battery. Relay 1107 operates and locks over the upper contacts of relays 1106 and 1107 to grounded conductor 1121. The operation of relay 1107 opens the locking circuits of relays 1232 and 1233 and these relays release.

Relay 1107 also opens the locking circuit of relay 1110 as well as the circuit for checking the normal condition of the hold magnets. When relays 1232, 1233 and 1110 have all released, relay 1106 also releases slowly, in turn releasing relay 1107. The previously traced circuit over the back contacts of all the hold magnets is now reclosed, operating relay 1111. Relay 1111 locks under the control of relay 1110 and operates relay 1112. Relay 1112 again operates relays 950 and 550. With both of these relays operated, ground is connected to conductor 954 and over the outer lower front contact of relay 1111, inner upper front contact of relay 1114, to resistance 1116 in shunt of the winding of relay 1115 which now releases, relay 1114 being held over the normal contacts of relay 1115. The release of relay 1115 closes the odd select magnet operating circuit which may be traced from grounded conductor 1123, over the upper back contact of relay 1115, conductor 1127, over the left back contacts of the even numbered select magnet relays 546, 540, 948, etc., outer left front contact of relay 940 to the winding of select magnet 931 and battery. Relay 931 extends its operating ground over conductor 962, lower front contact of relay 1114, inner lower front contact of relay 1111 to the winding of relay 1110 and battery. Relay 1110 operates, locks under the control of relay 1107 and releases relays 1111 and 1112, relay 1112 being sufficiently slow in releasing to permit relay 1111 to open the circuit of relay 1114 and the latter relay to release in turn releasing the even select magnet 930 and relay 940. When relay 1112 releases, relays 950 and 550 release and relay 941 operates in parallel with select magnet 931. The release of relay 114 also provides a locking circuit for relay 941 and magnet 931. With relay 941 operated the third group relay is operated and the scanning relays 1200 to 1209 are connected to the next ten lamp conductors. Relay 1110 operated and relay 1112 released operate relay 951 to connect the first ten hold magnets to the scanning relays 1200 to 1209 and the recording proceeds as above described. In advancing to the next or third level relays 1114 and 1115 are reoperated as for the first level.

The select magnet relays of switch 500 being included in the same chain as those of switch 900, the advance from the last level of the switch 900 to the first level of the switch 500 is the same as the advance from level to level of switch 900. However, select magnet 530 extends its operating ground over conductor 554, first to relay 953 which operates, locks to grounded conductor 1123 and extends from select magnet 530 to conductor 955 after which the operation is as previously described. Relay 953 transfers the circuits formerly used for operating relays 951 and 952 to the windings of relays 551 and 552 respectively, so that the hold magnets 510 to 529 of switch 500 are controlled thereafter by the scanning relays 1200 to 1209.

The release of the recorder will be described hereinafter.

*Character control relays*

The lamp conductors are identified by combinations of letters and numbers and the character control relays are arranged to transmit a maximum of two alphabetical characters, two numerical characters and a space character for making a distinction between items on the printed record. However, other items may include two letters and one number, one letter and one or two numbers, one, two or three letters with no number and one number without any letters. The operation of the character control relays under all these conditions will be described. In addition the line designation is transmitted by a special circuit which will also be described subsequently.

Assume first that two alphabetical and two numerical characters are to be transmitted, for example LJ12 (line junctor 12) which would be the case, were scanning relay 1208, select magnet 938 and hold magnet 928 operated and cross-point 963 closed, the contacts of the cross-point being cross-connected over conductors 964, 965, 966 and 967 through cable 958 to the windings of relays 812, 410, 417 and 423 respectively. As soon as the cross-point is closed, the circuit of relay 812 is completed from battery, winding of relay 812, conductor 964 through cable 958, outer left contact of cross-point 963, conductor 1050, through cable 1051, middle lower back contact of relay 1002, lower back contacts of relays 1012, 1022, 1032 and 1042, conductor 1238, inner upper back contact of relay 1222, lower front contact of relay 1102 to grounded conductor 1121. Relay 812 will cause segments 104 and 107 of distributor 100 to be connected to conductor 430 and will cause a revolution of brush 110 to transmit the signal. As described, the return of the brush to normal operates relay 118 which closes a circuit from battery through the winding of relay 1001, inner lower back contact of relay 1002, upper back contacts of relays 1043, 1033, 1023, 1013 and 1003, conductor 136, back contact of relay 122, conductor 838, back contact of relay 832, conductor 135, upper back contact of relay 119, outer lower front contact of relay 118, conductor 128, middle upper back contact of relay 1222 to grounded conductor 1125. Relay 1001 operates, locks over this circuit independent of relays 1002 to 1042 and operates relay 1002 which locks to conductor 128. The operation of relay 1002 releases character relay 812 in turn releasing relays 114, 116, 117, 118 and 1001.

Figure 1:
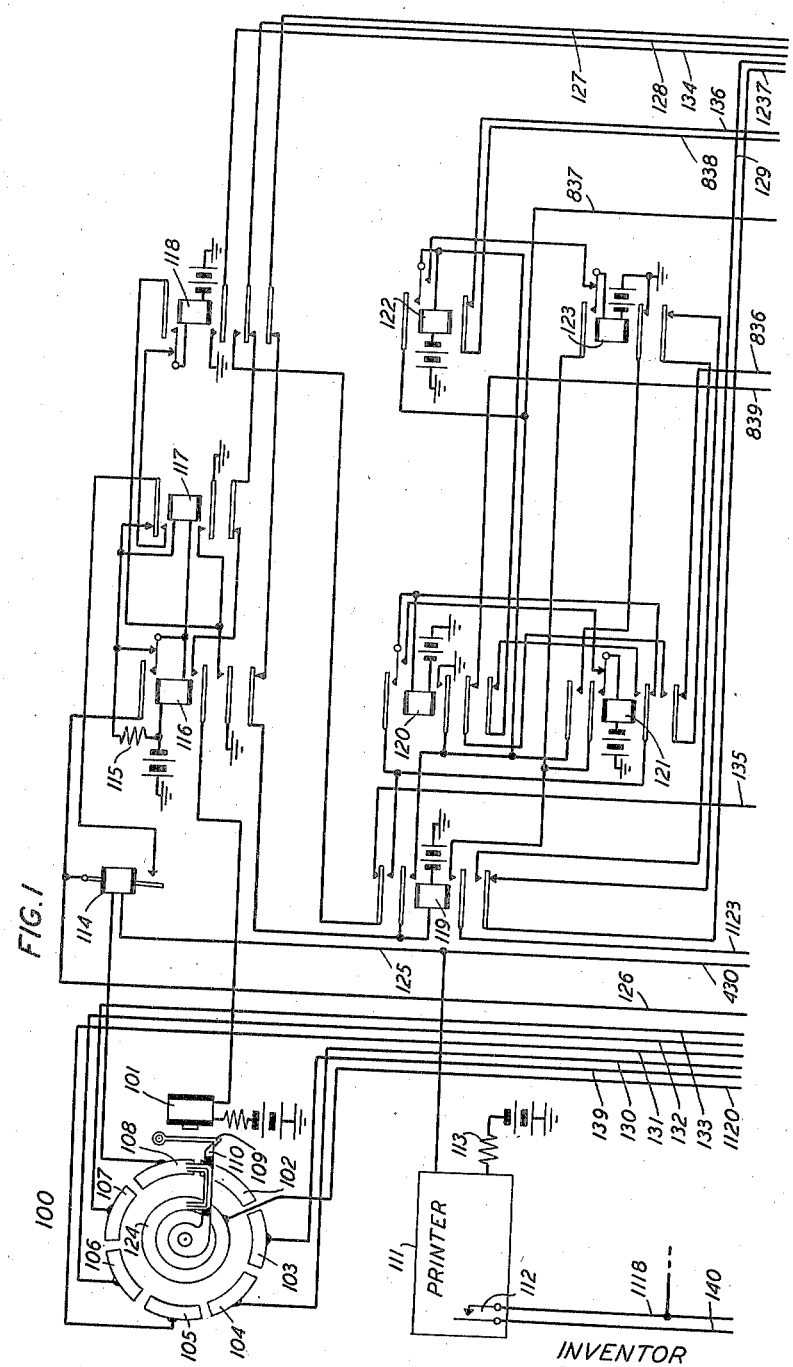
Fig. 1 shows schematically a teletype transmitter distributor and a teletype printer together with circuits controlling the operation thereof.
Figure 2:
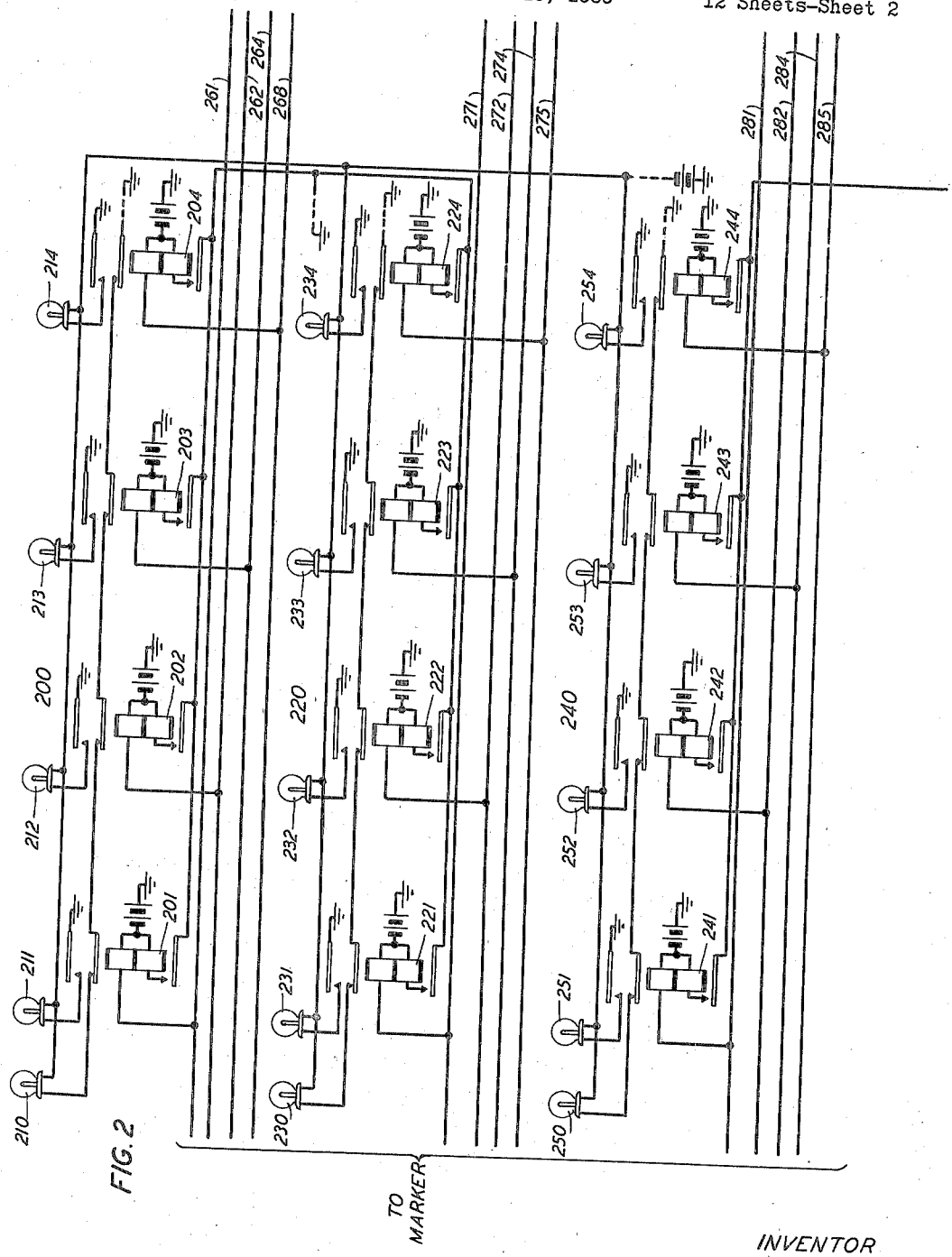
Figs. 2 and 6 show a portion of a trouble indicator including the line designation and frame registers.
Figure 3:
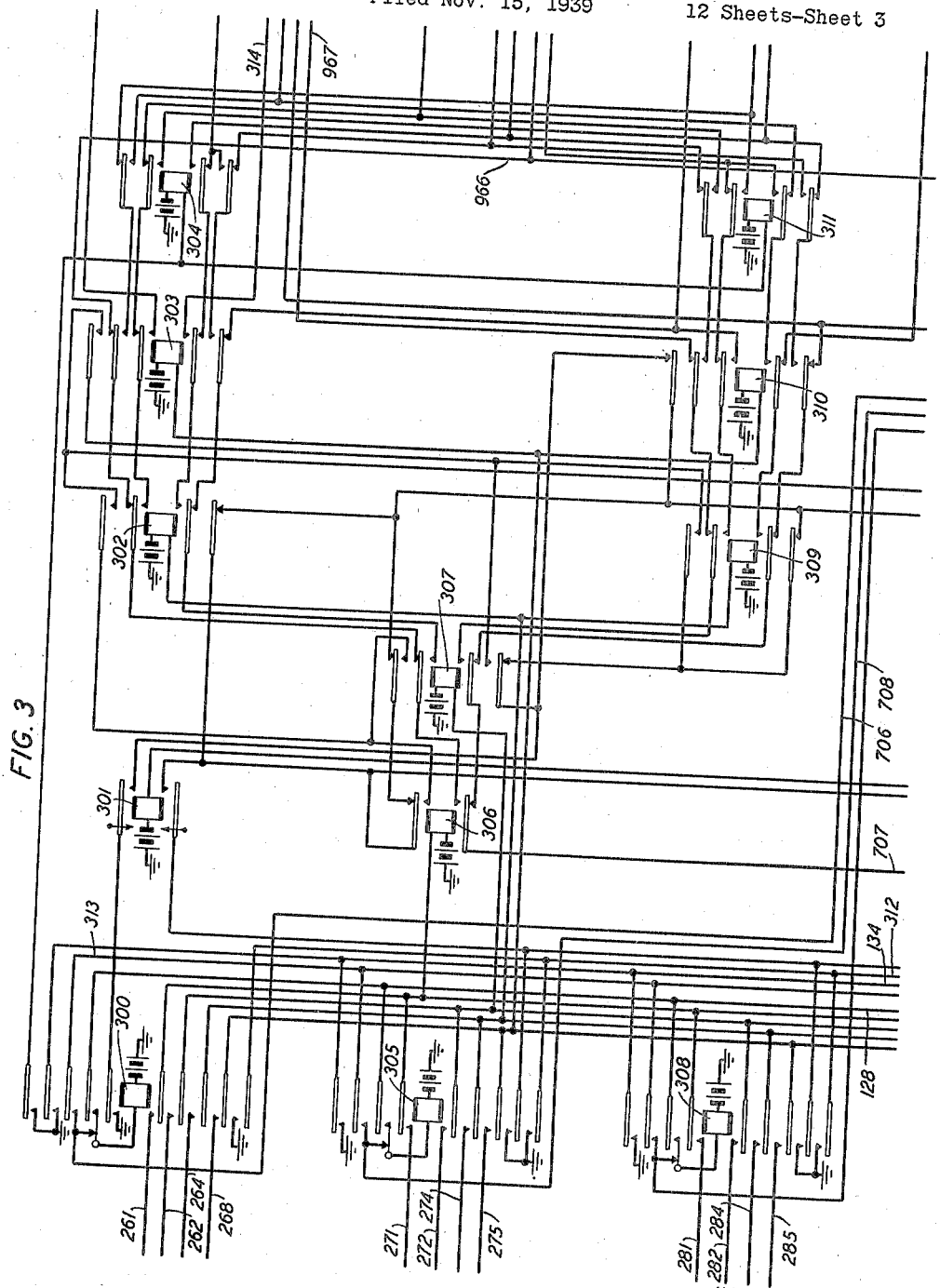
Figs. 3 and 7 show the circuits for translating the line designation record in the trouble indicator into a numerical record.

With relay 1001 released, the circuit of character relay 410 is closed over conductor 965, inner left contact of crosspoint 963, conductor 1052, outer lower back contact of relay 1001, middle lower front contact of relay 1002 and over the back contacts of relays 1012, 1022, 1032 and 1042 to ground over conductor 1238 as traced for the first character relay. The letter J is then transmitted, followed by the operation of relay 118. The circuit controlled by relay 118 now extends as before to the inner lower front contact of relay 1002, middle lower back contact of relay 1001, lower back contact of relay 703, inner lower back contact of relay 702, inner lower back contact of relay 1012 to the winding of relay 1011 and battery. Relay 1011 operates, locks to this circuit independent of relay 1012 and operates relay 1012 which locks to conductor 128. Relay 1012 releases the character relay 410 and in turn the relays of Fig. 1 and relay 1011.

It is now necessary to transmit a signal to the teletypewriter 111 which will prepare it to print numerical characters. Therefore the character relay operating circuit now extends as before to the outer lower front contact of relay 1012, outer lower back contact of relay 1011, conductor 1054, to the normal contacts and winding of relay 1043 and battery and in parallel therewith to the winding of relay 831 and battery. Relay 1043 operates and locks to ground over conductor 128. Under the control of relay 831 an "upper case" signal is transmitted to the teletypewriter 111 which will cause it to translate signals corresponding to the letters P, Q, W, E, R, T, Y, U, I and O into the numerical characters 0 to 9, respectively.

When relay 118 operates, after the transmission of the "upper case" signal, relay 1021 is operated over the circuit previously traced to the upper back contact of relay 1033 thence over the upper front contact of relay 1043, inner lower back contact of relay 1022, to battery through the winding of relay 1021, in turn operating relay 1022 to cause the release of relay 1021, to open the circuit of character relay 831 and to close the circuit of character relay 417. The circuit of relay 417 may now be traced from battery through the winding of relay 417, conductor 966, inner right contact of cross-point 963, conductor 959, lower back contact of relay 1021, middle lower front contact of relay 1022, lower back contact of relay 1032 and thence as traced to grounded conductor 1121. The digit 1 is transmitted, after which relay 1031 is operated following the operation of relay 118 over a circuit which extends as previously traced to the inner lower armature of relay 1012, over the front contact of that relay, inner lower back contact of relay 1011, inner lower front contact of relay 1022, middle lower back contact of relay 1021, outer upper back contact of relay 1013, conductor 1053, upper back contact of relay 703, lower back contact of relay 700, middle lower back contact of relay 702, lower back contact of relay 705, inner lower back contact of relay 1032, to the winding of relay 1031 and battery. Relay 1031 operates relay 1032 which releases the character relay 417 and the transmitter control relays 114, 116, 117 and 118 followed by the release of relay 1031.

Character relay 423 is now operated and the digit 2 transmitted. The circuit of relay 423 may be traced from battery through its winding, conductor 967, the outer right contact of cross-point 963, conductor 960, inner lower back contact of relay 1031, middle lower front contact of relay 1032 and thence as traced to ground on conductor 1121.

After the transmission of the digit 2, relay 118 operates relay 1041 which in turn operates relay 1042, releases the character relay 423 and the transmitter control relays and is itself released. With relay 1042 operated, ground on conductor 1238 extends over the lower front contact of relay 1042, lower back contact of relay 1041, conductor 840 to the winding of relay 832 and battery.

"Space" character relay 832 causes a signal to be transmitted which causes the teletypewriter to leave a space after the item just completed so that the next item will not be confused with the one just typed and also, to return to the condition for printing letters. When the "space" character has been transmitted, the operation of relay 118 with scanning relay 1208 and character relay 832 operated, operates relay 1218 over the circuit previously traced for operating relay 1210 to release hold magnet 928.

If only one numerical character is to be transmitted, following the two letters, the outer right contact of the corresponding cross-point is connected to conductor 840 so that the "space" character will be transmitted following the first number. It will be noted that the operation of relay 832 transfers the circuit controlled by relay 118 from the character control relays to the hold magnet control relays so that it is not necessary to operate relays 1041 and 1042.

If only one letter is to be transmitted followed by numbers, the inner left contact of the cross-point is connected to "upper case" relay 831. Therefore, when relays 1001 and 1002 have operated and relay 1001 has released, character relay 831 is operated and in parallel therewith relay 1043 is operated and locked.

With relay 1043 operated, when relay 118 operates, the circuit controlled thereby may be traced as before to the outer upper armature of relay 1043 and thence over the front contact of that armature, inner lower back contact of relay 1022 to the winding of relay 1021 and battery. The subsequent operations are as above described.

If only one letter is to be sent and no numbers, the outer left contact of the cross-point is connected to conductor 841, and the inner left contact to the desired character relay. Relay 1023 operates over conductor 841, locks to conductor 128 and connects ground from conductor 1238 over the outer lower back contact of relay 1042, inner lower front contact of relay 1023, outer lower back contact of relay 1001 to conductor 1052. The character relay is operated and the corresponding character sent. When relay 118 operates, the circuit extends as before to the outer upper armature of relay 1023 and over the front contact of that armature and the inner lower back contact of relay 1042 to the winding of relay 1041 and battery. Relays 1041 and 1042 cause the transmission of a "space" and the advance to the next cross-point.

If two letters are to be transmitted without any numbers, the outer left contact of the cross-point is connected to conductor 842 and the inner contacts are connected to character relays. Relay 1013 is operated over conductor 842 and locks to conductor 128. Relay 1013 closes the character relay operating circuit over the inner left contact of the cross-point, permitting the transmission of the corresponding character. When relay 118 operates at the end of the revolution, relay 1013 extends the circuit controlled thereby from conductor 136, over the outer upper back contact of relay 1003, middle upper front contact of relay 1013, over the inner lower back contact of relay 1022 to the winding of relay 1021. Since relays 1011 and 1012 were not operated, the "upper case" signal was not transmitted, and relay 1022 controls the operation of the character relay connected to the inner right contact of the cross-point. When relay 118 operates after the transmission of the second character, the circuit controlled thereby extends as traced to the inner lower armature of relay 1022, over the front contact of that armature, middle lower back contact of relay 1021, outer upper front contact of relay 1013 over the inner lower back contact of relay 1042 to the winding of relay 1041. Relays 1041 and 1042 function as previously described.

When three letters are to be transmitted without any numbers, the outer left contact of the cross-point is connected to conductor 835, operating relay 1003. Relay 1003 immediately closes the circuit of the inner left contact of the cross-point. When relay 118 operates after the first letter has been transmitted, relay 1022 is operated and the circuit over the inner right contact of the cross-point is closed. Relays 1032 and 1042 are operated as previously described to transmit the third letter and the "space" character.

It is also possible to transmit a single numerical character by connecting the outer left contact of the cross-point to conductor 1054 to operate the "upper case" relay 831 and prepare the printer to print numbers. Relay 1043 being operated in parallel with relay 831, relays 1021 and 1022 operate in response to the first operation of relay 118 and prepare the circuit over the inner right contact of the cross-point which is connected to the desired character relay. The outer right contact of the cross-point is connected to conductor 840 so that a "space" character is transmitted with relay 1032 operated, thereby terminating the function of the cross-point.

*Recording line and frame numbers*

In the trouble indicator, the identity of the subscriber's line and of the incoming frame is indicated by sets of lamps which are lighted in various combinations, as the result of grounding from one to four conductors. These lamps and the relays which control them are shown in Figs.

2 and 6. While the identity of these conductors might be printed in the same manner as for the other conductors, a more convenient form of record would be provided if the conductor combinations were translated into the corresponding digit.

Such a translating arrangement has been provided, together with means for recording the grounding of false combinations. Four conductors can be combined in sixteen ways, of which ten correspond with the ten digits, and six represent false combinations resulting from crossed or open conductors and have been identified by letters. While the combinations used for the thousands digit are the same as those used for other digits, in general, they correspond to different digits. Following is a table showing the possible combinations and the digits or letters thousands which they correspond as applied to the thousands register 200 and the hundreds register 220.

| Digit or letter | Conductors grounded by hundreds register | Conductors grounded by thousands register |
| --- | --- | --- |
| 0 | None | None. |
| 1 | 271 | 261. |
| 2 | 272 | 262. |
| 3 | 271–272 | 261–262. |
| 4 | 274 | 264. |
| 5 | 275 | 261–264. |
| 6 | 271–275 | 262–264. |
| 7 | 272–275 | 261–262–264. |
| 8 | 271–272–275 | 268. |
| 9 | 274–275 | 261–268. |
| A | 271–274 | 262–268. |
| B | 272–274 | 264–268. |
| C | 271–272–274 | 261–262–268. |
| D | 271–274–275 | 261–264–268. |
| E | 272–274–275 | 262–264–268. |
| F | 271–272–274–275 | 261–262–264–268. |

For the frame identification, the grounding of conductor 660 indicates a tens digit.

In transmitting the line and frame numbers the last five cross-points of a particular level are reserved, and the corresponding conductors controlled by the group relay appertaining to that level are grounded directly. Therefore the last five scanning relays are operated and, when the information conveyed to the first five scanning relays has been disposed of, the sixth scanning relay operates the corresponding hold magnet. The outer left contact of the cross-point closed by the operation of the hold magnet is connected to conductor 706, operating thousands group relay 300. Relay 300 locks over its second upper contact to conductor 128 and extends conductors 261, 262, 263 and 268 to the windings of relays 306, 307, 309 and 310, respectively, relays 302 and 303 being connected in parallel with relays 309 and 310. In addition, relay 300 closes a circuit for relays 304 and 311 and grounds conductor 134. At its outer lower contact relay 300 closes a circuit over conductor 312, normal contacts of relays 705 and 702, to the winding of relay 301 and battery. Relay 301 is slow to operate so that sufficient time is allowed for the relays 306, 307, 302, 303, 309 and 310 to operate.

Assume that the thousands digit is 2 and that relay 307 operates correctly. When relay 301 operates, a circuit is closed from ground at the inner upper contact of relay 300, upper contact of relay 301, outer upper back contact of relay 310, to the winding of relay 705 and battery. Relay 705 operates and locks over its inner upper front contact to ground on conductor 312. At the same time, the operating circuit of relay 300 is extended over the third upper contact of relay 300, conductor 313, outer upper front contact of relay 705, to conductor 1054, operating character relay 831 to condition the printer for printing numbers. Relay 1043 operates in parallel with relay 831.

With relay 307 operated, the operation of relay 118 following the transmission of the "upper case" code, closes a circuit as before to conductor 136, upper back contacts of relays 1003, 1013, 1023 and 1033, outer upper front contact of relay 1043, inner lower back contact of relay 1022 to the winding of relay 1021 and battery. Relay 1021 operates relay 1022, which in turn releases character relay 831 and relay 1021, thereby closing the circuit over the inner right contact of the cross-point which contact is connected to conductor 707 and the circuit is completed over the lower back contact of relay 306, inner lower front contact of relay 307, upper back contact of relay 309, middle upper back contact of relay 310 to conductor 967 and the winding of character relay 423 and battery.

Character relay 423 performs its functions to set the printer for printing numeral 2 and when relay 118 operates, the circuit controlled thereby extends from ground to conductor 136, over the upper back contacts of relays 1003, 1013, 1023 and 1033, outer upper front contact of relay 1043, inner lower front contact of relay 1022, middle lower back contact of relay 1021, outer upper back contact of relay 1013, conductor 1053, upper back contact of relay 703, lower back contact of relay 700, middle lower back contact of relay 702, lower front contact of relay 705, conductor 1236 and over the contacts of the scanning relays 1200, etc. to the sixth relay of the group 1210, etc. This relay locks and functions to advance the circuit to the next cross-point as above described. This advance releases the thousands group relay 300, in turn, releasing relay 705.

The next cross-point has its outer left contact connected to conductor 708 for operating the hundreds group relay 305. This relay locks and connects through the conductors 271, 272, 274 and 275 associated with the hundreds register 220 of the trouble indicator. Relay 305 operates relay 301 and grounds conductor 134 as did the thousands relay. Assume now, that due to a trouble condition, conductors 271, 272, 274 and 275 are all grounded. Relays 306, 307, 302, 309, 303 and 310 are all operated. The operation of relay 301, therefore, closes a circuit from ground at the fourth lower contact of relay 305, lower front contact of relay 301, upper front contact of relay 306, outer upper front contact of relay 302, to the winding of relay 702 and battery. Relay 702 operates and locks over its outer upper front contacts and the upper normal contacts of relay 705 to ground on conductor 312. In addition, it closes a circuit from battery, through the winding of character relay 833, middle upper front contact of relay 702, conductor 313 to ground over the operating circuit of relay 305. Character relay 833 transmits a code to the printer which returns it to the condition to print letters. Relay 118 operates relay 1001 followed by relay 1002 in the usual manner. When relay 1001 releases, the circuit over the inner left contact of the cross-point is closed, which is connected to conductor 707. The character relay circuit, therefore, extends over the lower front contact of relay 306, inner upper front contact of relay 307, inner lower front contacts of relays 302 and 303 to conductor 314, winding of relay 806 and battery. Relay 806 operates and transmits the code for the letter F. The completion of printing this letter advances the circuit to the next cross-point as described for the thousands digit.

The tens and units digits are transmitted in a similar manner. However, with units group relay 700 operated the operation of relay 118, following the transmission of the digit, completes a circuit which extends as traced for the thousands digit to conductor 1053 and thence over the upper back contact of relay 703, outer lower front contact of relay 700, to the inner lower back contact of relay 1032 and the winding of relay 1031. The release of relay 1031 in the usual manner closes the circuit over the outer right contact of the cross-point which, in this case, is connected to conductor 840 to cause the transmission of a "space" character which automatically advances the circuit to the next cross-point as before.

When this cross-point closes, the frame group relay 701 and relay 703 are operated over the outer left contact of the cross-point. Relay 701 connects conductors 651, 652, 654 and 655 to relays 302, 303 and 306 to 310 and conductor 660 to relay 704. As soon as relay 701 has operated it extends its operating ground directly to conductor 1054, operating relays 831 and 1043 to transmit the "upper case" code to the printer. Relay 118 operating at the end of the transmission operates relays 1021 and 1022, releasing relay 831. When relay 1021 releases, the circuit over the inner right contact of the cross-point is closed, which contact is connected to conductor 709 and, according as relay 704 is or is not operated, to character relay 417 or 416 to control the transmission of the tens digit of the frame designation. When this digit has been sent, relays 1031 and 1032 are operated and relay 1031 then released, the release of relay 1031 closing the circuit over the outer right contact of the cross-point which is connected to conductor 710. Conductor 710 is connected over the outer lower back contact of relay 702 to conductor 707 and over the contacts of relays 306, 307, 303 and 304 to the corresponding character relays. When the proper character relay is operated, the code corresponding to the frame units digit is transmitted. Relay 118, operating at the end of the code, operates relays 1041 and 1042 which in turn cause the transmission of the "space" code and the advance to the next cross-point.

The action in case a false code is registered on the frame register 620 differs from that during the printing of the line number. With relay 701 operated, the circuit over which relay 702 or relay 705 is operated is not closed until relays 1021 and 1022 have operated and relay 1021 released, for controlling the transmission of the frame tens digit. At that time a circuit is closed from ground at the lowermost contact of relay 701, outer lower front contact of relay 1022, inner lower back contact of relay 1021, to the armatures of relays 302 and 306 and over those contacts to relay 705 or 702 according as the combination registered is a true or false combination. If relay 705 operates the transmission proceeds as described. However, if relay 702 is operated, the circuit over which the frame units character relay was operated, is now open and the connection of ground to conductor 710 over the cross-point contact, closes a circuit over the outer lower front contact of relay 702, outer lower front contact of relay 1032, upper back lower front contact of relay 1031, outer lower back contact of relay 1002, to the winding of relay 1033 and battery and in parallel therewith to the winding of character relay 833. Relay 1033 locks to conductor 128 and relay 833 causes the transmission of the "lower case" signal to prepare the printer for printing a letter. At the end of the cycle, relay 118 operates and, with relays 1033 and 702 operated, closes a circuit for operating relays 1001 and 1002. With relays 702 and 1002 operated, and relay 1001 released, conductor 710 is connected with conductor 707 and the character relay operated. When the frame units character has been transmitted, relay 118 grounds conductor 136, completing a circuit over the upper back contacts of relays 1003, 1013 and 1023, upper front contact of relay 1033, inner upper front contact of relay 702, inner lower front contact of relay 1002, middle lower back contact of relay 1001, lower front contact of relay 703, inner lower back contact of relay 1042 to the winding of relay 1041 and battery. Relays 1041 and 1042 cause the transmission of the "space" character and the advance to the next cross-point in the usual manner.

*End of line control*

If the information to be printed should be sufficient to bring the teletypewriter to the end of a line, the end contact 112 is closed mechanically by the printer carriage. With contact 112 closed, ground on conductor 1118 is extended over conductor 140 to the winding of relay 1228 and battery. Relay 1228 opens the hold magnet operating circuit but the operated hold magnet is held operated until the corresponding information has been transmitted. Whenever a hold magnet is operated, ground on conductor 1121 is extended over the normal contacts of relay 1107, normal contacts of previous hold magnets in the series, front contact of the operated hold magnet to the winding of relay 1227 and battery. Relay 1227 closes the circuit of the hold magnet independent of relay 1228 and also renders relay 1228 ineffective. When relay 1222 operates, it opens the hold magnet circuit as described in the transfer from one cross-point to the next, which releases relay 1227. With relay 1228 operated, the release of relay 1227 closes a circuit from ground at the front contact of relay 1228, back contact of relay 1227, conductor 127, outer lower back contact of relay 118, lower back contact of relay 116, winding of relay 119 and battery. Relay 119 closes a circuit from ground on conductor 1121, front contact of relay 1231, conductor 1237, outer lower front contact of relay 119, outer lower back contacts of relays 123 and 121 to conductor 836, winding of character relay 834 and battery. With relay 834 operated, conductor 837 is grounded and relay 119 locks thereto to prevent its premature release. Character relay 834 causes the transmission of the "carriage return" signal which causes the teletypewriter carriage to return to its normal position. The operation of relay 118 at the end of the cycle closes a circuit from ground on conductor 128, outer lower front contact of relay 118, outer upper front contact of relay 119, inner lower back contact of relay 121 to the winding of relay 120 and battery. Relay 120 operates, locks over its operating circuit independent of relay 121 and extends that circuit to relay 121. Relay 120 connects ground to the holding circuit of relay 119 to prevent its release when relay 121 operates and releases the character relay 834. Relay 121 extends the locking circuit of relay 119 to the back contact of relay 123 and locks to conductor 1123 over the inner lower front contact of relay 119.

The release of character relay 834 releases relay 118 which in turn releases relay 120. With relay 121 operated and relay 120 released, the character relay operating circuit extends from ground on conductor 1237, outer lower front contact of relay 119, back contact of relay 123, outer lower front contact of relay 121, inner lower back contact of relay 120, to conductor 839, winding of character relay 830 and battery. Relay 830 controls the transmission of a "line feed" signal which causes the teletypewriter to advance the paper into position to receive another line.

When relay 118 operates at the end of the signal, relay 122 operates over the outer lower back contact of relay 120, inner lower front contact of relay 121, outer upper front contact of relay 119, outer lower front contact of relay 118 to ground over conductor 128. Relay 122 locks to conductor 837 and extends ground to the winding of relay 123 and battery. Relay 123 operates and locks over its upper contacts and the inner lower front contact of relay 119 to conductor 1123. At its outer lower contact relay 123 opens the character relay circuit and at its inner lower contact removes ground from conductor 837. When the character relay has released, relays 119, 121 and 122 release followed by relay 123. Since the return of the carriage released relay 1228, the recorder is now ready to proceed with recording.

Release of recorder

The release of the recorder is controlled by cross-point 555 which is operated in response to the operation of scanning relay 1200 and hold magnet 910 by direct ground on conductor 1239 when group relay 1221 is operated following the transmission of all the information to the teletypewriter. The outer left contact of crosspoint 555 is connected to conductor 843, which in turn extends directly to the trouble indicator and there operates a relay which releases the trouble indicator. This relay also opens conductors 1117 and 1129 to release start relay 1103.

The release of relay 1103 removes ground from conductor 1118 to bring the transmitter and printer motors to rest. It also removes ground from conductors 1123, 1125 and 1121 to release the scanning relays, the character control relays, etc., and to restore the recorder to normal.

Relay 1103 cannot reoperate if conductor 1117 is immediately reclosed since relay 1104 is locked to the back contact of relay 1108. Relay 1104 holds relay 1105 operated, which keeps ground on conductor 1119 to supply ground to interrupter 1100 and to hold relays 1101 and 1102 operated. When relay 1103 releases it connects relay 1109 to the right contact of interrupter 1100. When the interrupter closes its right contact, relay 1109 operates, and locks to conductor 1119, and connects relay 1108 to the left contact of the interrupter 1100. When the interrupter 1100 closes its left contact, relay 1108 operates, locks to conductor 1119 and opens the locking circuit of relay 1104. Relay 1104 releases, followed after an interval by relay 1105 and after a further interval by relay 1108. The delay introduced by the operation of relays 1109 and 1108 is to permit the teletypewriter motor to be at rest before disconnecting ground from distributor segment 124 by the release of relay 1104, as opening of the signal lead before the teletypewriter has been stopped would result in typing an extra character when the motor is started for the next recording.

What is claimed is:

1. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, means for closing the cross-points corresponding to the grounded conductors, means for preparing circuits for operating one or more character relays over the closed cross-points, a teletype sender, a teletype printer controlled thereby, and means to complete circuits for said character relays to control said teletype sender.

2. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, said cross-points being arranged in a plurality of levels, means for preparing the cross-points of said levels in succession, a group of scanning relays, means responsive to the preparation of a particular level for connecting said scanning relays to the conductors corresponding to the prepared level, means under the control of said scanning relays for closing the cross-points corresponding to grounded conductors, means for preparing circuits for operating one or more character relays over the closed cross-points, a teletype sender, a teletype printer controlled thereby, and means to complete circuits of said character relays to control said teletype sender.

3. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, said cross-points being arranged in a plurality of levels, means for preparing the cross-points of said levels in succession, a group of scanning relays, means responsive to the preparation of a particular level for connecting said scanning relays to the conductors corresponding to the prepared level, means under the control of said scanning relays for closing the cross-points corresponding to grounded conductors, means for preparing circuits for operating one or more character relays over the closed cross-point, a teletype sender, a teletype printer controlled thereby, and means for successively closing the circuits of said character relays to control said teletype sender.

4. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a crossbar switch having cross-points corresponding to said conductors, said cross-points being arranged in a plurality of levels, means for preparing the cross-points of said levels in succession, a group of scanning relays, means responsive to the preparation of a particular level for connecting said scanning relays to the conductors corresponding to the prepared level, means under the control of said scanning relays for closing the cross-points corresponding to grounded conductors, means for preparing circuits for operating one or more character relays over the closed cross-points, a teletype sender, a teletype printer controlled thereby, and a series of steering relays for successively completing the circuits of said character relays over an operated cross-point to control said teletype sender.

5. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, means for closing the cross-points corresponding to grounded conductors, means for preparing circuits for operating one or more character relays over the closed cross-points, a teletype sender, a teletype printer controlled thereby, a series of steering relays for successively completing the circuits of said character relays over an operated cross-point to control said teletype sender, and means controlled over said cross-points for varying the effective number of said steering relays.

6. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, means for closing the cross-points corresponding to grounded conductors, means for preparing circuits for operating one or more character relays over the closed cross-points, a teletype sender, a teletype printer controlled thereby, a series of steering relays for successively completing the circuits of said character relays over an operated cross-point to control said teletype sender, and means controlled over said cross-points for varying the effective number of steering relays in accordance with the characters to be transmitted.

7. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, means for closing the cross-points corresponding to grounded conductors, means for preparing circuits for operating one or more character relays over the closed cross-points, a teletype sender, a teletype printer controlled thereby, a series of steering relays for successively completing the circuits of said character relays over an operated cross-point to control said teletype sender, and means controlled over said cross-points for rendering only certain of said steering relays effective.

8. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, means for closing the cross-points corresponding to grounded conductors, means for preparing circuits for operating one or more character relays over the closed cross-points, a teletype sender, a teletype printer controlled thereby, a series of steering relays, said relays normally effective to close said circuits in succession, and means controlled over said cross-points for closing certain of said circuits independent of said steering relays.

9. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, means for closing the cross-points corresponding to grounded conductors, means for preparing circuits for operating one or more character relays over the closed cross-points, a teletype sender, a teletype printer controlled thereby, a series of steering relays for successively completing the circuits of said character relays over an operated cross-point to control said teletype sender, means under the control of certain of said steering relays to complete circuits for character relays which control the operation of said printer and means under the control of said cross-points for operating said last mentioned character relays independent of said steering relays.

10. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, means for closing the cross-points corresponding to grounded conductors, means for preparing circuits for operating one or more character relays over the closed cross-points, a teletype sender, a teletype printer controlled thereby, a series of steering relays for successively completing the circuits of said character relays over an operated cross-point to control said teletype sender, means under the control of certain of said steering relays to complete circuits for character relays which control the operation of said printer and means under the control of said cross-points for operating said certain steering relays independent of the other steering relays.

11. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, means for closing the cross-points corresponding to grounded conductors, means for preparing circuits for operating one or more character relays over the closed cross-points, a teletype sender, a teletype printer controlled thereby, a series of steering relays for successively completing the circuits of said character relays over an operated cross-point to control said teletype sender, means under the control of said steering relays for normally operating a space character relay following the operation of the last character relay prepared by said cross-point and means for preventing the operation of said space character under the control of certain cross-points.

12. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, means for closing the cross-points corresponding to grounded conductors, means for preparing circuits for operating one or more character relays over the closed cross-points, a teletype sender, a teletype printer controlled thereby, a series of steering relays for successively completing the circuits of said character relays over said cross-points to control said teletype sender, means for operating a space character relay under the control of the last of said steering relays and means for operating said space character relay under the control of said cross-point independent of said last steering relay.

13. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, said cross-points being arranged in a plurality of levels, means for preparing the cross-points of said levels in succession, a group of scanning relays, means responsive to the preparation of a particular level for connecting said scanning relays to the conductors corresponding to the prepared level, means under the control of said scanning relays for closing the cross-points corresponding to grounded conductors, means for preparing circuits for operating one or more character relays over the closed cross-points, a teletype sender, a teletype printer controlled thereby, a series of steering relays for successively completing the circuits of said character relays over an operated cross-point to control said teletype sender, and means controlled over said cross-points for varying the effective number of said steering relays.

14. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, said cross-points being arranged in a plurality of levels, means for preparing the cross-points of said levels in succession, a group of scanning relays, means responsive to the preparation of a particular level for connecting said scanning relays to the conductors corresponding to the prepared level, means under the control of said scanning relays for closing the cross-points corresponding to grounded conductors, means for preparing circuits for operating one or more character relays over the closed cross-points, a teletype sender, a teletype printer controlled thereby, a series of steering relays for successively completing the circuits of said character relays over an operated cross-point to control said teletype sender, and means controlled over said cross-points for varying the effective number of steering relays in accordance with the characters to be transmitted.

15. In a telephone system employing a control device, a trouble indicator comprising a plurality of lamps indicating trouble conditions in said control device, and means for making a record of the lamps lighted in response to a trouble condition comprising a plurality of conductors connected in parallel with said lamps, means for grounding said conductors in accordance with the trouble condition, a cross-bar switch having cross-points corresponding to said conductors, said cross-points being arranged in a plurality of levels, means for preparing the cross-points of said levels in succession, a group of scanning relays, means responsive to the preparation of a particular level for connecting said scanning relays to the conductors corresponding to the prepared level, means under the control of said scanning relays for closing the cross-points corresponding to grounded conductors, means for preparing circuits for operating one or more character relays over the closed cross-points, a teletype sender, a teletype printer controlled thereby, a series of steering relays for successively completing the circuits of said character relays over an operated cross-point to control said teletype sender, means under the control of said steering relays for normally operating a space character relay following the operation of the last character relay prepared by said cross-point and means for preventing the operation of said space character under the control of certain cross-points.

16. In a telephone system, a control device, a trouble indicator comprising a plurality of lamps for indicating trouble conditions in said control device, and means for making a record of the lamps lighted in response to a trouble condition comprising a plurality of conductors connected in parallel with said lamps, a plurality of groups of said conductors grounded in accordance with a code to represent the digits of a line designation, means for successively translating the code representative of said digits into numerical representations therefor, a printer and means for controlling said printer in accordance with said numerical representations.

17. In a telephone system, a control device, a trouble indicator comprising a plurality of lamps for indicating trouble conditions in said control device, and means for making a record of the lamps lighted in response to a trouble condition comprising a plurality of conductors connected in parallel with said lamps, a plurality of groups of said conductors grounded in accordance with a code to represent the digits of a line designation, a set of relays responsive to the grounding of said line code conductors, means for successively associating said set of relays with said groups of conductors, a printer and means for causing said printer to print a numerical character under the control of said set of relays in response to each association of said set of relays with a group of conductors.

18. In a telephone system, a control device, a trouble indicator comprising a plurality of lamps for indicating trouble conditions in said control device, and means for making a record of the lamps lighted in response to a trouble condition comprising a plurality of conductors connected in parallel with said lamps, a plurality of groups of said conductors grounded in certain combinations in accordance with a code representative of the digits of a line designation, the grounding of other combinations indicating a trouble condition, means for successively translating said grounded combinations, said translating means being effective to translate said certain combinations into numerical designations and said other combinations into alphabetical designations, a printer and means for controlling said printer in accordance with said translated designations.

OSCAR MYERS.